United States Patent [19]

Golben

[11] Patent Number: 5,419,981

[45] Date of Patent: May 30, 1995

[54] HYDROGEN ELECTROCHEMICAL CELL HOUSING

[75] Inventor: P. Mark Golben, Florida, N.Y.

[73] Assignee: Ergenics, Inc., Ringwood, N.J.

[21] Appl. No.: 146,997

[22] Filed: Nov. 1, 1993

[51] Int. Cl.$^6$ .................................... H01M 12/08
[52] U.S. Cl. ............................ 429/37; 429/66; 429/101; 429/174
[58] Field of Search ............... 429/35, 37, 101, 152, 429/174, 66

[56] References Cited

U.S. PATENT DOCUMENTS

| | | | |
|---|---|---|---|
| 3,442,714 | 5/1969 | Matsuno | 429/35 |
| 3,743,544 | 7/1973 | Stewart | 429/35 X |
| 4,159,367 | 6/1979 | Berchelli et al. | 429/101 X |
| 4,751,153 | 6/1988 | Roth | 429/35 |
| 4,909,807 | 3/1990 | Klink et al. | 429/174 X |
| 5,162,171 | 11/1992 | Jones | 429/101 |
| 5,250,368 | 10/1993 | Golben et al. | 429/101 X |

Primary Examiner—Stephen Kalafut
Attorney, Agent, or Firm—Dorn, McEachran, Jambor & Keating; Vangelis Economou

[57] ABSTRACT

An electrochemical battery made of stacked cells which are separated by separator plates comprising a good heat conductive material, e.g. nickel, stainless steel, copper. The separator plates extend beyond the edge of the stacked cells and outside the enclosure of the battery. The separator plates directly conduct heat, which is generated by the electrochemical process, from the battery cells to the ambient environment. Sealing of the enclosure between the separator plates is provided by an O-ring or, alternatively, by a bellows sealed to adjacent separator plates by O-rings. Sealing is possible for hydrogen at low pressure which is presented in batteries utilizing a metal-hydride hydrogen storage capacity.

10 Claims, 1 Drawing Sheet

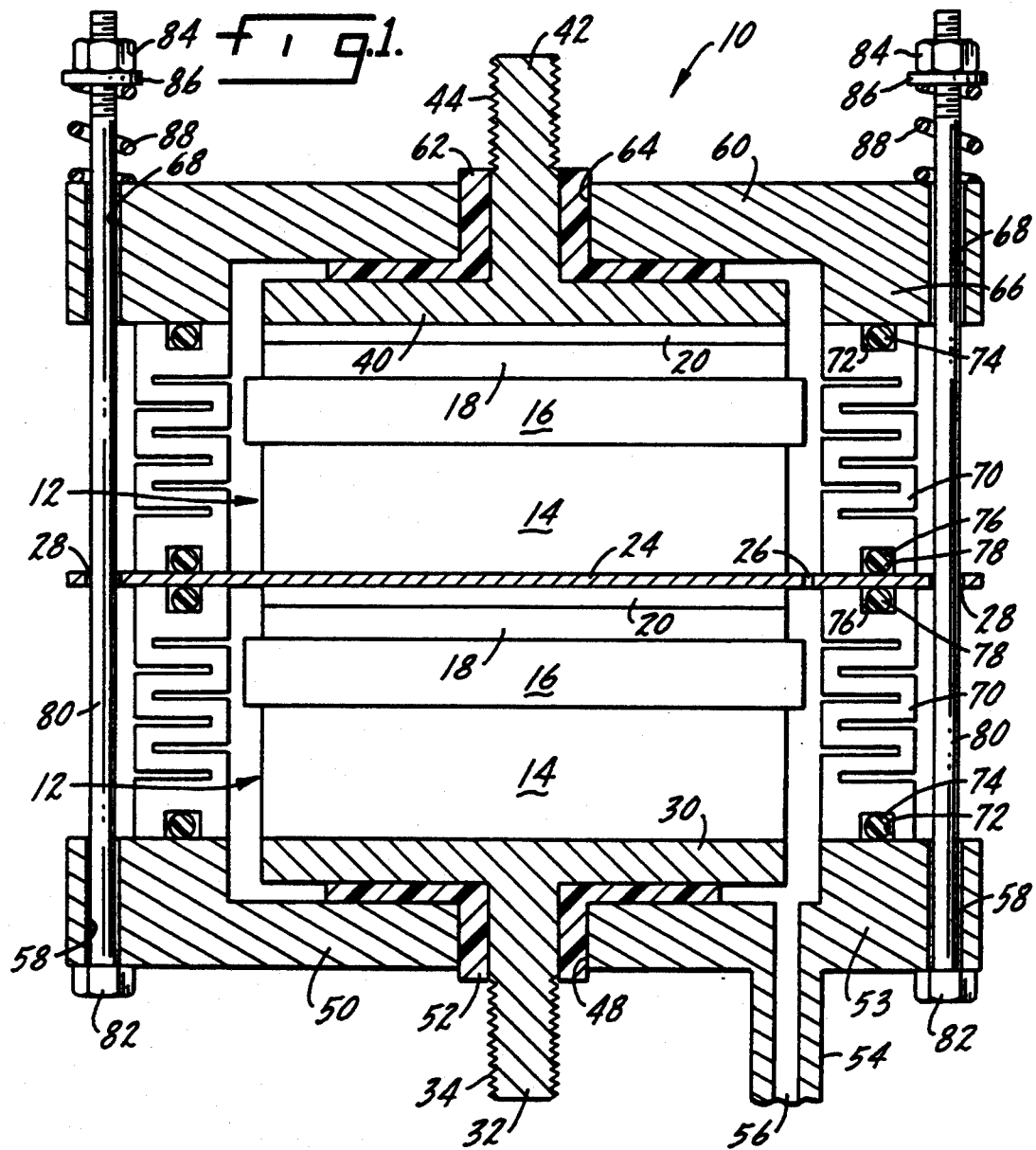
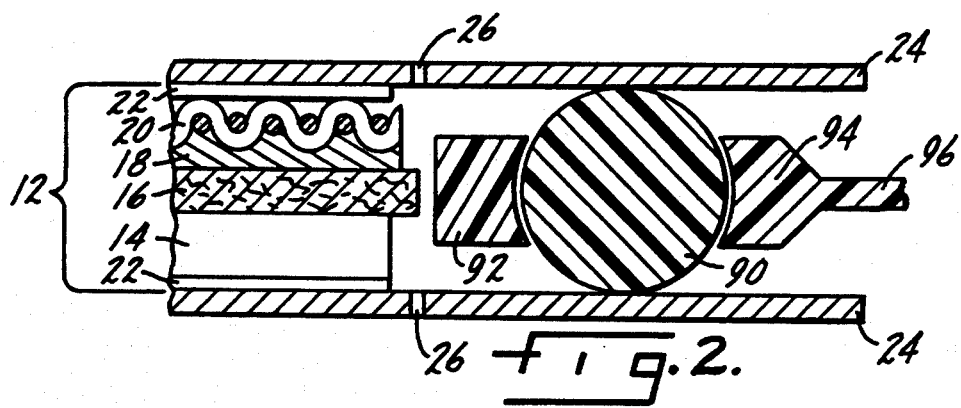

HYDROGEN ELECTROCHEMICAL CELL HOUSING

RELATED PATENT INFORMATION

This invention is the subject of Disclosure Document No. 331230 filed on May 24, 1993, and incorporated by reference herein. U.S. Pat. No. 5,250,368, assigned to a common assignee as the present invention, teaches using a metal hydroxide-hydrogen battery operating at low hydrogen pressure, which low pressure battery is essential for use of the inventive embodiments described herein.

BACKGROUND OF THE INVENTION

1. Field of the Invention

This invention relates generally to metal oxide hydrogen batteries and more particularly to metal oxide-hydrogen batteries which provide for withdrawal of heat generated during battery operation.

2. Background Art

Metal oxide hydrogen batteries and in particular nickel oxide hydrogen batteries are expected to play a prominent role in research and development for and the future production of electric vehicles.

Metal oxide hydrogen batteries have been proposed which provide electric power through introduction of hydrogen within an enclosed chamber. The enclosed chamber is necessarily contained within an outer pressure vessel because of the high pressures which are generated by the introduction of hydrogen from a storage capacity outside of the pressure vessel. Such a device is described in U.S. Pat. No. 5,162,171 issued to Jones.

Devices of this type require heat removal from the pressure vessel because the hydrogenation-dehydrogenation process which occurs during discharge and recharge of the batteries generates tremendous amounts of heat. Devices of this type comprise battery cells within the high pressure chamber and include a series of flat bodies or fins having flanges which abut a metal wall of the high pressure chamber. Heat generated by the cell is transferred through the metal bodies and through the flanges into the wall of the high pressure vessel and the high pressure vessel then dissipates the heat into the ambient environment.

Heat transfer efficiency of these types of devices necessarily depends upon the quality and amount of contact between the flanges of the fins and the walls of the pressure vessels. Consequently, some mechanism is required to overcome a number of problems. A major problem is to provide and maintain good contact between the flanges or fins and the outer wall. For example, the flanges must be discontinuous around the edge of the fins so as to enable the flanges to conform to outer vessel shells that may be slightly out of round. Moreover, other considerations such as expansion of the outer walls of the pressure vessel and of the flanges and fins during battery operation must be taken into account in designing these types of devices.

Another major consideration is cost. High pressure hydrogen batteries require a massive and structurally integral enclosing outer pressure vessel, as such batteries cannot operate without the vessel. Due to safety considerations, these outer pressure vessels must be very strong and are tested to pressures several times the maximum expected hydrogen pressure. Should the vessel have a structural flaw such as a weak spot or even a minuscule leak, there exists danger of hydrogen escape and possibly of accelerated hydrogen combustion. The risk of such an event for high pressure hydrogen is such that extraordinary, and extremely expensive, measures are necessary to avoid the possibility of a catastrophic event.

Another factor adding to the cost of high pressure hydrogen batteries is the inability to change the configuration of the outer pressure vessel. That is, predetermined sizes and shapes of pressure vessels may be available, but the design of any device utilizing a hydrogen battery of the high pressure type must necessarily take into account the size and shape of the battery and hydrogen source vessel. Although these may be to some extent customized for a specific need, such customization also incurs great expense.

SUMMARY OF THE INVENTION

What is needed is a battery construction which permits heat to be transferred from the inside of a battery enclosure efficiently and effectively. Preferably, heat removal is not dependent on the transfer of heat through a contact between separate elements of the device. Furthermore, a modular system which can be built up or taken apart as the particular needs of an end user require is preferable over a standard size and shape of a hydrogen battery. Also, a battery utilizing hydrogen at low temperatures is to be preferred over a high pressure type so as to avoid the necessity of a massive, bulky and expensive outer pressure vessel, and to decrease the risk of hydrogen escape because of a weak point or a leak in the vessel. In accordance with the present invention, there is provided a nickel hydrogen cell battery design which includes separator plates or fins that extend outside the containment walls of the battery.

The invention further provides for a low pressure, modular, bi-polar electrochemical battery comprising a stack of bi-polar metal hydride battery cells, the edges of said cell defining a cell stack outer surface, a positive electrode disposed at one end of said cell stack, a negative electrode disposed at the other end of said cell stack, an enclosed, airtight housing for said battery cell stack including a first end plate disposed at said one end of said battery stack adjacent said positive electrode, a second end plate disposed at said other end adjacent said second electrode, a series of separator plates extending laterally beyond the edges of the stacked battery cells and being disposed between adjacent ones of said battery cells to separate each cell from adjacent cells, means to seal between the separator plates, and hydrogen communication means between said housing and a source of hydrogen removed and separated from said housing.

BRIEF DESCRIPTION OF THE DRAWINGS

FIG. 1 illustrates in a cross-sectional view an embodiment according to the present invention.

FIG. 2 illustrates a detail of the longitudinal wall according to a second embodiment of the present invention.

DETAILED DESCRIPTION OF THE PREFERRED EMBODIMENT

FIG. 1 illustrates in a cross-sectional view an inventive electrochemical battery cell and improved housing 10. For purposes of clarity, only two battery cells are shown in the battery 10. However, any number of battery cells can be utilized in the battery 10 provides that all of the various elements making each battery cell 12 are included therein. Any number of battery cells may be used and the device may be customized to provide the number of battery cells necessary for a particular need of the end user. Each of the battery cells has identical elements, thus the identifying numerals for the various elements will be identical for each of the cells.

In general, any type of metal hydroxide-hydrogen cell may use the teaching of this invention. For purposes of illustration, a pair of nickel hydroxide-hydrogen cells are used. Such cells are described in U.S. Pat. No. 5,047,301 which is commonly assigned to the assignee of the present invention, and the teaching of that patent is incorporated by reference herein.

Each cell 12 comprises a positive electrode 14 of nickel hydroxide ($Ni(OH)_2$) which is placed into contact with a soaked separator 16, generally comprising a glass fiber material that has been soaked in potassium hydroxide (KOH). The separator 16 separates the positive electrode 14 from the negative electrode 18 which in this case comprises platinum (Pt). A hydrogen diffusion screen 20 comprising a nickel or copper fine mesh screen is disposed adjacent the negative electrode 18. Each of these elements comprise essentially flattened bodies with substantially planar surfaces which may have a circular or other shape so that surfaces between the adjacent elements may interact.

Separating any two adjacent cells 12 is a heat and electrical conductive separator plate 24 which extends beyond the edge of the stack of the cells 12. As will be explained below, the separator plates 24 conduct heat outside of the enclosure of the battery and should comprise a good conductor of heat and electricity, such as nickel, stainless steel or copper. Preferably, this material is capable of withstanding corrosion which may result from contact with the potassium hydroxide in the battery. Throughholes 26 of the separator plate 24 provide a means for hydrogen to flow therethrough and may be equidistantly disposed around the periphery of the separator plates 24. Separator plates 24 preferably have a diameter which is larger than the diameter of the battery cell elements 14,16,18.

The cell stack is bounded by current collecting plates 30,40 at either end of the stack. Using the two cell stack in FIG. 1, a positive electrode current collecting plate 30 is disposed adjacent the nickel hydroxide positive electrode 14 which is at the lowermost end of cell 12, the cell 12 being at the lowermost end of the cell stack. The current collecting plate 30 has an identical flat shape as do the elements comprising the cells; that is, if the elements are round, then the plate 30 is round; if square, then the plate 30 is square.

Plate 30 is connected to or integral with a positive electrode lead 32 which extends away from the battery and can be connected to a device that uses the electricity provided by the battery 10. Outside the battery housing, the electrode lead 32 includes threads 34 for screwing on an electrically connecting nut.

Similarly, a negative electrode collector plate 40 is disposed at the opposite end of the stack at the uppermost end of the cell stack, as shown in FIG. 1. The plate 40 adjoins the hydrogen gas diffusion screen 20 which is at the uppermost end of the uppermost cell 12. The negative electrode lead 42 extends outwardly from the plate 40 and from the stack of cells 12 to provide a negative electrode lead to complete the electrical circuit provided by the battery. Threads 44 are provided around the negative electrode lead 42 outside the battery housing in a conventional manner to provide an appropriate electrical connection to the battery.

End plates are also provided at either end of the stack of cells 12 to maintain the stack of cells together in the battery and to provide end walls for the battery enclosure. End plate 50 is disposed adjacent the positive electrode current collecting plate 30 and is insulated therefrom and from the lead 32 by appropriate insulation 52. The insulation 52 extends through a centrally disposed aperture 48, 54 in the end plate 50 which also provides a through hole for the extension of the lead 32. The electrical insulation 52 separates the end plate 50 from the battery stack of cells 12 to prevent a short-circuit of the electrical circuit.

The end plate 50 further includes a tubular projection 54 having a bore 56 within it, which bore 56 extends through the end plate 50 and away from the battery 10. The bore 56 provides a hydrogen gas connection to gas purification equipment and to a source of hydrogen as is described in aforementioned U.S. Pat. No. 5,250,368. The end plate 50 also includes two holes 58 for joining the end plate to a second end plate 60 disposed on the opposite end of the battery stack.

The second end plate 60 is provided on the opposite end of the battery stack of cells 12 and is essentially identical to the end plate 50, except that in the preferred embodiment plate 60 includes insulation 62 within a throughhole 64, centrally located in the end plate 60, through which the negative electrode 42 extends. Axially extending throughholes 68, at peripheral edges of the end plate 60, match the pattern of peripheral through holes 58 in the end plate 50 so that when lined up, the peripheral through holes 58,68 are coaxial.

The end plates 50,60 are part of the inventive enclosure for the battery stack of cells 12 and provide two end walls therefor. A longitudinally extending series of bellows 70 are disposed around the battery stack, one bellows around each of the battery cells 12. A first bellows 70 includes an outwardly facing end having an annular groove 72 which is adjacent the flanged portion 66 of the end plate 60. The bellows may comprise an appropriate material, such as plastic or metal.

An O-ring 74 made of an appropriate material that can withstand a significant amount of heat, such as VITON, is disposed within the groove 72 and provides a seal between the bellows 70 and the end plate flanged portion 66. At another end of the bellows 70, an outwardly facing groove 76, which extends annularly about that end of the bellows 70, is formed to receive a second O-ring 78 which seals that end of the bellows against the separator plate 24 disposed between the battery cells 12. Thus, a seal is formed between the bellows and the end plates of the flanged portion 66 and between the bellows and the separator plate 24.

An adjacent next cell 12, indicated in FIG. 1, also has a bellows 70 and an end in which a groove 72 is disposed adjacent the flanged portion 53 of the end plate 50. The bellows end comprises an end portion which includes a groove 76 adjacent the separator plates 24 in which an O-ring 78 seals the bellows to the separator plate. The bellows are expandable to a limited degree in the vertical or axial direction while maintaining a seal between all of the battery cells within the housing provided by the bellows and the end plates 50,60. Of course, in a commercial embodiment of the present invention, a number of battery cells arranged in a stack will be used and thus certain bellows will be required to seal between two separator plates 24 rather than between a separator plate 24 and an end plate 50,60 as shown in FIG. 1.

The battery cell stack and the bellows constructions are held together in the stack by the end plates which depress the stack of cells 12 and the bellows 70 together. Alignment of the end plates and separator plates is provided by a series of threaded shafts 80 disposed through the end plate bore 58, through each of the separator plate bores 28 and through the end plate bore 68 of end plate 60. One end of the threaded shaft 80 may comprise a bolt head 82 which is adjacent one of the end plates 50,60. The embodiment of FIG. 1 shows the bolthead 82 adjacent to end plate 50 for reasons of placement efficiency. The other end of the shaft 80 includes a nut 84 and a washer 86 that is threaded on to the end of the threaded shaft 80. The nuts 84 are not adjacent the end plate 60 but are held separated therefrom by a spring 88 which is biased against the end plate 60.

As will be explained below, the cells 12 in the battery stack will have a variable thickness which changes during battery operation so that the distance between the end plates 50,60 will vary to a small degree. The spring 88 is designed to accommodate the variance in the distance between the end plates by contracting and thus permitting the end plate 60 to move vertically toward the nut 84 of the threaded shaft 80. The metal bellows 70 will accommodate such an expansion of the battery stack enclosure while the O-ring 74,78 will maintain the seal within the enclosure.

It has been found that metal hydride cells and the materials comprising them, such as nickel hydroxide, expand significantly upon the absorption of hydrogen during battery operation. Expansion greater than twenty percent can be accommodated by the design. Such expansion of the thickness of the battery cell must be accommodated to permit efficient operation of the battery cells 12. Thus, as hydrogen is introduced into the battery stack through the tube 56, and the hydrogen is absorbed within the battery cells 12 to provide the electrical power, the cells will expand and will push the end plate up against a spring which will contract to some extent so as to accommodate the expansion of the cells.

Improvements in battery cell design of the hydrogen type, such as that described in aforementioned U.S. Pat. No. 5,250,368 allow significant reduction in the pressure of the hydrogen within the battery 10 from the pressures which are required in the conventional metal chamber high pressure devices, such as the ones taught by U.S. Pat. Nos. 5,162,171, 5,071,652 and the like. Whereas a metal outer enclosure is necessary for maintaining the rigidity and integrity of a conventional device when hydrogen is under high pressure, the inventive device does not require an enclosure capable of withstanding high pressure simply because the inventive battery has no hydrogen under high pressure. Thus, the advantage of having a low pressure hydrogen chamber allows the flexibility and ability to customize the size and power of a battery depending on the required need, and additional cells 12 may be added to the stack.

A second embodiment of the battery cell and separator plate is shown in FIG. 2 showing the longitudinal wall in detail. FIG. 2 also provides a detailed cross-sectional view of the cell stack edge portion of a battery. The battery cell 12 includes the elements of the stack as shown in FIG. 1, and includes a positive nickel-hydroxide electrode 14, a soaked hydroxide separator 16, a platinum electrode 18, a hydrogen diffusion screen 20, and a graphite sheet 22 which distributes the electrical contact of the wire mesh hydrogen diffusion screen 20, all provided in one single battery cell 12. The graphite sheet 22 may comprise a thickness up to about 0.005 inch GRAFOIL. A graphite sheet 22 may also be disposed at the positive end of the cell 12 between positive electrode 14 and the separator plate 24. The FIG. 1 embodiment may also utilize one or more graphite sheets, but these are not shown therein.

The battery cell is disposed between two separator plates 24 and include throughholes 26 which provide for hydrogen gas diffusion from one cell to the next as in the embodiment of FIG. 1. The separator plates 24 extend outside of the enclosure to remove heat much as in the FIG. 1 embodiment.

The difference in the FIG. 2 embodiment resides in the thickness of the battery cell 12 and in the size of the O-ring 90 which extends from one separator plate 24 to the other separator plate 24. The O-ring 90 is annularly disposed around the periphery of the battery cell 12 and is separated therefrom by an internal plastic O-ring support 92 which is annularly disposed around the inner diameter of the O-ring 90. The internal support may be made of plastic or other rigid durable material which can withstand significant temperature differentials without deforming. The internal plastic O-ring support 92 provides support to the O-ring so the O-ring does not blow in when the hydrogen is removed from the inner enclosure and a vacuum or partial vacuum is produced in the enclosure surrounding the battery cell.

Similarly, an external plastic support O-ring 94 is annularly disposed around the O-ring 90 along its outer diameter to prevent the positive pressure blow-out of the O-ring when the pressure of the hydrogen within the enclosure surrounding the battery cells increases. In a preferred embodiment, the external plastic O-ring support extends beyond the separator cooling plates 24 to prevent electrical shorts between them. As in the embodiment of FIG. 1, throughholes (not shown) through each of the separator plates and through the external plastic O-ring extension 96 are provided for insertion of the threaded bolts 80. A number of cells such as the cell 12, together with the separator plates and O-rings 90 are stacked one on top of another as is described above to produce a battery providing sufficient electrical power for the end user.

Modifications to the invention may become apparent to a person of ordinary skill in the art following an understanding of the inventive concept described herein. For example, other modifications may include the ability to replace spent battery cells while retaining the enclosure and electrodes following extended use of the battery. Accordingly, this invention is not limited by the illustrated embodiment shown and described herein, but is limited only by the following claims.

What is claimed is:

1. A low pressure, modular, bi-polar electrochemical battery comprising:
    (a) a stack of bi-polar metal hydride battery cells, the edges of said cells defining a cell stack outer surface, the cells being susceptible to longitudinal expansion during battery operation;
    (b) a positive electrode of one said cell disposed at one end of said cell stack;
    (c) a negative electrode of another said cell disposed at the other end of said cell stack;

(d) an enclosed, airtight enclosure for said battery cell stack disposed laterally outwardly of said cell stack outer surface and including a first end plate disposed at said one end of said battery stack adjacent said positive electrode, a second end plate disposed at said other end adjacent said negative electrode, a series of separator plates extending laterally beyond the edges of the stacked battery cells and being disposed between adjacent ones of said battery cells to separate each cell from adjacent cells, and a longitudinally expandable means for sealing between the separator plates which means are shaped and dimensioned to accommodate the longitudinal expansion of the cells during battery operation; and (e) hydrogen communication means between said enclosure and a source of hydrogen, said hydrogen source being separate from said enclosure.

2. The battery according to claim 1 wherein said longitudinally expandable sealing means comprises at least one bellows disposed around each cell, each said bellows including at least one groove disposed at each opposite longitudinal end of each bellows for receiving an O-ring, said sealing means further comprising at least one O-ring disposed in each of said bellows end grooves, each said O-ring sealing between the respective longitudinal end of each bellows and the adjacent surface of either a separator plate or an end plate.

3. The battery according to claim 2 wherein said bellows comprise metal.

4. The battery according to claim 2 wherein said bellows comprise plastic.

5. The battery according to claim 1 wherein said sealing means comprises at least one O-ring disposed around each said cell for sealing between adjacent separator plates or between a separator plate and an end plate, each of said O-rings having a diameter at least as large as the thickness of a cell that has expanded from battery operation.

6. The battery according to claim 1 wherein said hydrogen communication means comprises a tubular connection which is attached to and extends through at least one of said end plates.

7. The battery according to claim 6 wherein said source of hydrogen separate from said enclosure comprises metal hydride in an enclosed chamber, said chamber being in fluid communication with said battery through said tubular connection.

8. The battery according to claim 1 wherein the separator plates further comprise at least one throughhole to provide fluid communication between one battery cell on one side of the separator plate and an adjacent battery cell on the other side of said separator.

9. The battery according to claim 1 wherein said longitudinally expandable sealing means further comprises discrete sealing members which are each shaped and dimensioned to accommodate the longitudinal expansion of the cell adjacent a corresponding one of said discrete sealing member.

10. The battery according to claim 1 wherein said longitudinally expandable enclosure further includes a biasing means for biasing one end plate toward the other end plate and thereby maintaining the integrity of the cell stack and air tightness of said enclosure.

* * * * *